J. M. HUME.
Cultivator.
No. 64,878.  Patented May 21, 1867.
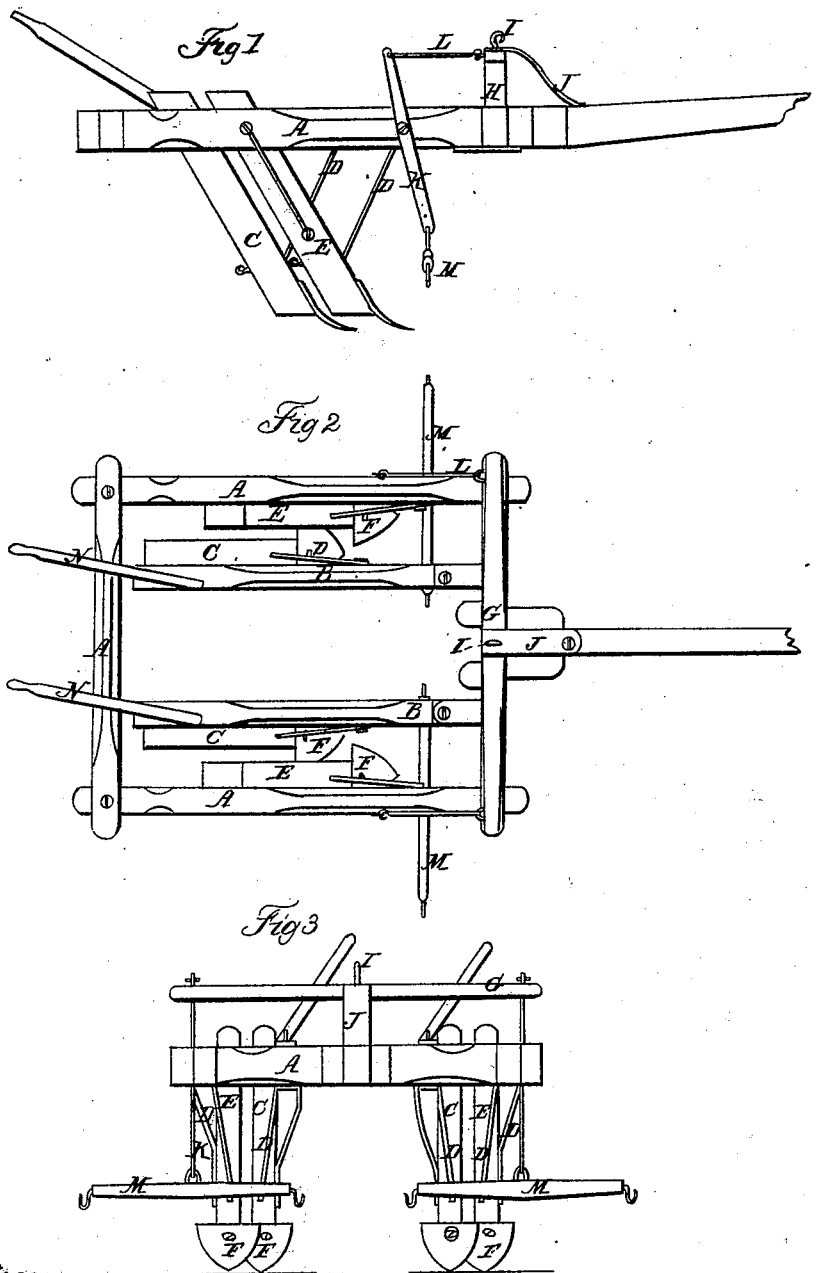
Witnesses:
W. H. Burridge
E. E. Wante
Inventor:
James M. Hume

United States Patent Office.

JAMES M. HUME, OF COLCHESTER, ILLINOIS, ASSIGNOR TO HIMSELF AND C. F. HOYT, OF THE SAME PLACE.

Letters Patent No. 64,878, dated May 21, 1867.

CULTIVATORS.

The Schedule referred to in these Letters Patent and making part of the same.

TO ALL WHOM IT MAY CONCERN:

Be it known that I, JAMES M. HUME, of Colchester, in the county of McDonough, and State of Illinois, have invented certain new and useful improvements in Cultivators; and I do hereby declare that the following is a full and complete description thereof, reference being had to the accompanying drawings, making a part of this specification, in which—

Figure 1 is a side view of the cultivator.

Figure 2 is a top view.

Figure 3, an end view.

Like letters refer to like parts in the different views presented.

This cultivator consists of the rectangular frame A, fig. 2, to the front end of which are hinged the beams B, so that they can be moved laterally to or from the side of the frame. To the free end of these beams are secured the standards C, braced by the rods D. To the inside of the frame are secured and braced in like manner the standards E. It will be seen that the standards E are placed a little in advance of standards C, and all of which are armed with the shield-shaped shovels F. G is the main bar of the double-tree, and is raised above the frame upon a short post, H, fig. 1, and secured to the same by a bolt, I, and stay, J. This bar is connected to the lever K by a link, L, to the lower end of which lever is attached the whiffle-trees M.

The practical operation of this implement is as follows: The operator takes his position behind the machine, holding on by the handles N. By means of the handles and adjustable beams the operator is enabled to control and so direct the implement as to cause the shares to disturb all the ground over which they may pass, by shifting, from time to time, as the nature of the field or ground may demand, the two adjustable shares, while the two outside ones keep the whole implement steady in its movement. By applying the draught to the sides of the frame, instead of the centre, in the usual way, the cultivator is made to run much more steady in rough ground; and hence the work is done more completely, and with less labor to the operator. The depth of the cultivator is regulated by the lever K, by shifting the single-tree further to or from the end, and thus changing the line of draught will cause the implement to run more or less into the ground; also, the draught being below the frame, it relieves the necks of the team from the weight of the machine; hence they will work with more ease and strength.

The advantages of this implement are, its thorough manner of disturbing the ground, and the complete control the operator has over the central shares, so that he is enabled to strike any part of the ground at will, without moving the entire machine. The adjustable standards and shovels or shares being so arranged that they fall in behind those connected to the frame, hence all the ground over which the machine may pass can be reached and disturbed at will. The draught being below the frame and at the sides, and the ease of regulating the depth of the machine makes it very steady in its operation, easy for the team, and convenient for the operator.

What I claim as my improvement, and desire to secure by Letters Patent, is—

The adjustable beams B, arranged in combination with the frame A, levers K, links L, bar G, and single-tree M, as and for the purpose substantially described.

JAMES M. HUME.

Witnesses:
E. L. HOBART,
WM. T. MUSSON.